(12) United States Patent
Asaki et al.

(10) Patent No.: US 11,859,548 B2
(45) Date of Patent: Jan. 2, 2024

(54) GAS TURBINE AND CONTROL METHOD THEREOF, AND COMBINED CYCLE PLANT

(71) Applicant: Mitsubishi Power, Ltd., Kanagawa (JP)

(72) Inventors: Daisuke Asaki, Kanagawa (JP); Masashi Terauchi, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 22 days.

(21) Appl. No.: 17/614,873

(22) PCT Filed: May 25, 2020

(86) PCT No.: PCT/JP2020/020462
§ 371 (c)(1),
(2) Date: Nov. 29, 2021

(87) PCT Pub. No.: WO2020/241543
PCT Pub. Date: Dec. 3, 2020

(65) Prior Publication Data
US 2022/0235703 A1 Jul. 28, 2022

(30) Foreign Application Priority Data
May 31, 2019 (JP) ................................. 2019-102891

(51) Int. Cl.
*F02C 7/10* (2006.01)
*F02C 6/18* (2006.01)
*F02C 9/18* (2006.01)

(52) U.S. Cl.
CPC ................. *F02C 7/10* (2013.01); *F02C 6/18* (2013.01); *F02C 9/18* (2013.01)

(58) Field of Classification Search
CPC .... F02C 7/04; F02C 7/047; F02C 7/18; F02C 3/30; F02C 6/18; F02C 7/10; F02C 9/18; F05D 2270/00
See application file for complete search history.

(56) References Cited

U.S. PATENT DOCUMENTS 5,317,877 A * 6/1994 Stuart ..................... F02C 7/185
60/736
5,414,992 A * 5/1995 Glickstein ............... F02C 7/224
60/39.83

(Continued)

FOREIGN PATENT DOCUMENTS

DE  112017001613 B4 * 12/2022 ................ F02C 6/08
EP      3540195 A1 *  9/2019 ............. F01K 23/06

(Continued)

OTHER PUBLICATIONS

International Search Report dated Jul. 21, 2020 in International (PCT) Application No. PCT/JP2020/020462.

(Continued)

*Primary Examiner* — Craig Kim
(74) *Attorney, Agent, or Firm* — Wenderoth, Lind & Ponack, L.L.P.

(57) ABSTRACT

In a gas turbine and a control method thereof, and a combined cycle plant, the gas turbine includes a compressor that compresses air, a combustor that mixes and combusts compressed air compressed by the compressor and fuel, a turbine that obtains rotational power using combustion gas generated by the combustor, a compressed air cooling heat exchanger that cools the compressed air to produce air for heat exchange, air temperature adjusting heat exchangers that exchange heat between the air and the compressed air, a heat exchange amount adjusting device that adjusts a heat exchange amount of each of the compressed air cooling heat exchanger and the air temperature adjusting heat exchangers, and a control device that controls the heat exchange amount adjusting device, in which the control device controls the heat exchange amount adjusting device based on a temperature of the air to be taken into the compressor.

17 Claims, 9 Drawing Sheets

(56) References Cited

U.S. PATENT DOCUMENTS

| | | | | |
|---|---|---|---|---|
| 5,918,458 | A * | 7/1999 | Coffinberry | F02C 7/185 60/785 |
| 10,100,739 | B2 * | 10/2018 | Kupratis | F02C 7/143 |
| 10,982,595 | B2 * | 4/2021 | Schwarz | F02C 7/141 |
| 11,073,085 | B2 * | 7/2021 | Staubach | F02K 3/077 |
| 11,559,122 | B2 * | 1/2023 | Sluder | A45C 5/04 |
| 2005/0252193 | A1 * | 11/2005 | Iya | F02K 1/822 60/266 |
| 2009/0235634 | A1 | 9/2009 | Wang et al. | |
| 2010/0089023 | A1 | 4/2010 | Harada | |
| 2012/0317988 | A1 | 12/2012 | Gardiner et al. | |
| 2013/0199192 | A1 * | 8/2013 | Zhang | F02C 3/30 60/39.01 |
| 2016/0341126 | A1 * | 11/2016 | Kupratis | F02C 7/143 |
| 2018/0347459 | A1 * | 12/2018 | Matsukuma | F02C 7/185 |
| 2019/0072032 | A1 * | 3/2019 | Kubo | F02C 7/10 |
| 2020/0224591 | A1 * | 7/2020 | Sodaro | F02C 7/22 |
| 2022/0235703 | A1 * | 7/2022 | Asaki | F02C 7/10 |

FOREIGN PATENT DOCUMENTS

| | | |
|---|---|---|
| JP | 2003-161164 | 6/2003 |
| JP | 2003-239760 | 8/2003 |
| JP | 2009-228678 | 10/2009 |
| JP | 2011-47365 | 3/2011 |
| JP | 2013-160227 | 8/2013 |
| JP | 2017-155736 | 9/2017 |

OTHER PUBLICATIONS

Office Action dated Apr. 11, 2023 in corresponding Japanese Patent Application No. 2019-102891, with Machine English translation, 10 pages.

* cited by examiner

GAS TURBINE AND CONTROL METHOD THEREOF, AND COMBINED CYCLE PLANT

FIELD

The present invention relates to a gas turbine, a control method of the gas turbine, and a combined cycle plant including the gas turbine.

BACKGROUND

A gas turbine includes a compressor, a combustor, and a turbine. The compressor compresses air taken from an air intake to produce high-temperature and high-pressure compressed air. The combustor supplies fuel to the compressed air and combusts the mixture to generate high-temperature and high-pressure combustion gas. The turbine is driven by the combustion gas to drive a generator coaxially coupled to the turbine.

In a power-generating plant using a gas turbine, it is desired to enable high-efficiency operation not only in rated load operation but also in partial load operation. The output characteristics of the gas turbine fluctuate depending on an intake temperature. Therefore, in a case in which an output of the gas turbine is required to be reduced, the output can be reduced by an increase in the intake temperature without operating the gas turbine with a partial load. In addition, in the gas turbine operated with a partial load, fuel consumption can be minimized while complying with discharge regulations by a turndown range being widened. Examples of intake heating devices for such a gas turbine are described in the following Patent Literatures.

CITATION LIST

Patent Literature

Patent Literature 1: Japanese Patent Application Laid-open No. 2013-160227
Patent Literature 2: Japanese Patent Application Laid-open No. 2017-155736

SUMMARY

Technical Problem

The compressor compresses air taken into the compressor to generate compressed air. The intake heating device of the conventional gas turbine described above increases the temperature of air to be taken into the compressor by heating the air with steam or the like generated by a heat recovery steam generator. In this case, the air to be taken into the compressor fluctuates depending on weather and seasons. Therefore, the temperature of the air to be taken into the compressor varies, and it is difficult to adjust the output of the gas turbine to a desired output.

The present invention is to solve the above-described problems, and an object of the present invention is to provide a gas turbine capable of adjusting an output of the gas turbine with high accuracy and a control method thereof, and a combined cycle plant.

Solution to Problem

In order to achieve the object described above, a gas turbine according to the present invention includes a compressor that compresses air; a combustor that mixes and combusts the compressed air compressed by the compressor and fuel; a turbine that obtains rotational power using combustion gas generated by the combustor; a compressed air cooling heat exchanger that cools the compressed air to produce air for heat exchange; an air temperature adjusting heat exchanger that exchanges heat between the compressed air and the air to be supplied to the compressor; a heat exchange amount adjusting device that adjusts a heat exchange amount of each of the compressed air cooling heat exchanger and the air temperature adjusting heat exchanger; and a control device that controls the heat exchange amount adjusting device. The control device controls the heat exchange amount adjusting device based on a temperature of the air to be taken into the compressor.

Therefore, the air temperature adjusting heat exchanger exchanges heat between the air and the compressed air, so that the air is heated with the compressed air, and the air whose temperature has increased by heating is taken into the compressor. In this case, the control device adjusts the heat exchange amount of the air temperature adjusting heat exchanger by the heat exchange amount adjusting device based on the temperature of the air to be taken into the compressor. That is, in a case in which the heat exchange amount of the air temperature adjusting heat exchanger is adjusted, a temperature of the air heated with the compressed air is adjusted. Here, since an output of the gas turbine changes depending on the temperature of the air to be taken into the compressor, the output of the gas turbine can be adjusted to a target output with high accuracy regardless of a load of the gas turbine.

In the gas turbine according to the present invention, a first temperature sensor that measures a temperature of the air heat-exchanged by the air temperature adjusting heat exchanger is provided, and the control device controls the heat exchange amount in the air temperature adjusting heat exchanger by the heat exchange amount adjusting device so that the temperature of the air measured by the first temperature sensor approaches a target temperature.

Therefore, since the control device controls the heat exchange amount in the air temperature adjusting heat exchanger by the heat exchange amount adjusting device so that the temperature of the air heat-exchanged by the air temperature adjusting heat exchanger approaches the target temperature, the temperature of the air to be taken into the compressor can be controlled with high accuracy.

In the gas turbine according to the present invention, a second temperature sensor that measures a temperature of the compressed air cooled by the compressed air cooling heat exchanger is provided, and the control device controls the heat exchange amount in the compressed air cooling heat exchanger by the heat exchange amount adjusting device so that the temperature of the compressed air measured by the second temperature sensor is maintained at a target temperature.

Therefore, since the control device controls the heat exchange amount in the compressed air cooling heat exchanger by the heat exchange amount adjusting device so that the temperature of the compressed air cooled with the compressed air cooling heat exchanger is maintained at a target temperature, the temperature of the air for heat exchange to be supplied to the turbine can be controlled with high accuracy.

In the gas turbine according to the present invention, the air temperature adjusting heat exchanger includes a first heat exchanger that exchanges heat between the air and a first medium, and a second heat exchanger that exchanges heat between the compressed air and the first medium, and the heat exchange amount adjusting device adjusts a heat exchange amount in the second heat exchanger.

Therefore, the second heat exchanger exchanges heat between the compressed air and the first medium to heat the first medium with the compressed air, the first heat exchanger exchanges heat between the air and the first medium to heat the air with the first medium, and the air whose temperature has increased by heating is taken into the compressor. In this case, the control device controls the heat exchange amount adjusting device based on the temperature of the air to be taken into the compressor to adjust the heat exchange amount in the second heat exchanger. That is, the amount of heat of the compressed air is adjusted to increase the temperature of the air through the first medium, and the temperature of the air to be taken into the compressor can be controlled with high accuracy.

In the gas turbine according to the present invention, a first cooling air supply line and a second cooling air supply line that supply the compressed air compressed by the compressor to the turbine as cooling air are provided in parallel, the second heat exchanger is provided in the first cooling air supply line, the compressed air cooling heat exchanger that exchanges heat between the compressed air and a second medium is provided in the second cooling air supply line, and a flow rate adjusting valve is provided as the heat exchange amount adjusting device in at least one of the first cooling air supply line and the second cooling air supply line.

Therefore, an opening degree of the flow rate adjusting valve is adjusted to adjust a flow rate of the compressed air flowing through the first cooling air supply line, so that the amount of heat supplied from the compressed air to the first medium can be adjusted by the second heat exchanger provided in the first cooling air supply line, and the temperature of the air to be taken into the compressor can be adjusted by the first medium with high accuracy.

In the gas turbine according to the present invention, a cooling air supply line that supplies the compressed air compressed by the compressor to the turbine as cooling air is provided, the second heat exchanger and the compressed air cooling heat exchanger that exchanges heat between the compressed air and a second medium are provided in the cooling air supply line in series, and a flow rate adjusting valve is provided as the heat exchange amount adjusting device in a first medium circulation line through which the first medium circulates between the first heat exchanger and the second heat exchanger.

Therefore, an opening degree of the flow rate adjusting valve is adjusted to adjust a flow rate of the first medium flowing through the first medium circulation line, so that the amount of heat supplied from the compressed air to the first medium can be adjusted by the second heat exchanger provided in the cooling air supply line, and the temperature of the air to be taken into the compressor can be adjusted by the first medium with high accuracy.

In the has turbine according to the present invention, the second medium is air or water.

Therefore, since air or water is used as the second medium and a material existing in the vicinity is used, it is possible to shorten a length of a pipe to be used, achieve the miniaturization of equipment, and suppress the increase in cost.

In the gas turbine according to the present invention, the compressed air cooling heat exchanger is provided in a first medium circulation line through which the first medium circulates between the first heat exchanger and the second heat exchanger.

Therefore, the compressed air cooling heat exchanger is provided in the first medium circulation line, so that the compressed air cooling heat exchanger, the first heat exchanger, and the second heat exchanger are disposed in the first medium circulation line, which enables the device to be compact.

In the gas turbine according to the present invention, the compressed air cooling heat exchanger is a cooling tower.

Therefore, the compressed air cooling heat exchanger is used as the cooling tower, so that the structure can be simplified.

In the has turbine according to the present invention, the heat exchange amount adjusting device includes an air bypass line that bypasses the air temperature adjusting heat exchanger to supply the air to the compressor, and a flow rate adjusting valve provided in the air bypass line.

Therefore, in a case in which it is not necessary to adjust the temperature of the air to be taken into the compressor, the air can be supplied from the air bypass line to the compressor by the flow rate adjusting valve without the air passing through the air temperature adjusting heat exchanger.

In the gas turbine according to the present invention, the air temperature adjusting heat exchanger includes a first heat exchanger that exchanges heat between the air and the compressed air, and a second heat exchanger that exchanges heat between the compressed air and a third medium, and the heat exchange amount adjusting device adjusts a heat exchange amount in the second heat exchanger.

Therefore, the second heat exchanger exchanges heat between the compressed air and the third medium to adjust the temperature of the compressed air by the third medium, the first heat exchanger exchanges heat between the air and the compressed air to heat the air with the compressed air, and the air whose temperature has increased by heating is taken into the compressor. At this time, the control device controls the heat exchange amount adjusting device based on the temperature of the air to be taken into the compressor to adjust the heat exchange amount in the second heat exchanger. That is, the amount of heat of the compressed air is adjusted, so that the temperature of the air to be taken into the compressor can be controlled with high accuracy.

Further, a control method according to the present invention is of a gas turbine that includes a compressor that compresses air, a combustor that mixes and combusts the compressed air compressed by the compressor and fuel, and a turbine that obtains rotational power using combustion gas generated by the combustor. The control method includes the steps of: cooing the compressed air; increasing a temperature of the air by an amount of heat recovered by cooling the compressed air; and adjusting the amount of heat of the compressed air that increases a temperature of the air based on a temperature of the air to be taken into the compressor.

Therefore, in a case in which the amount of heat of the compressed air is adjusted, a temperature of the air heated with the compressed air is adjusted. Here, since an output of the gas turbine changes depending on the temperature of the air to be taken into the compressor, the output of the gas turbine can be adjusted to a target output with high accuracy regardless of a load of the gas turbine.

Further, a combined cycle plant according to the present invention includes the above-mentioned gas turbine; a heat recovery steam generator that generates steam by exhausted heat of flue gas discharged from the gas turbine; and a steam turbine including a turbine driven by steam generated by the heat recovery steam generator.

Therefore, since an output of the gas turbine charges depending on the temperature of the air to be taken into the compressor, the output of the gas turbine can be adjusted to a target output with high accuracy regardless of a load of the gas turbine, and an operation region in the combined cycle plant can be expanded.

Advantageous Effects of Invention

According to the gas turbine and the control method thereof, and the combined cycle plant of the present invention, the output of the gas turbine can be adjusted with high accuracy.

DESCRIPTION OF EMBODIMENTS

Hereinafter, preferred embodiments of a gas turbine and a control method thereof, and a combined cycle plant according to the present invention will be described in detail with reference to the accompanying drawings. The present invention is not limited to this embodiment, and in a case in which there are a plurality of embodiments, the present invention also includes configurations in which the embodiments are combined with each other.

First Embodiment

Figure 1:
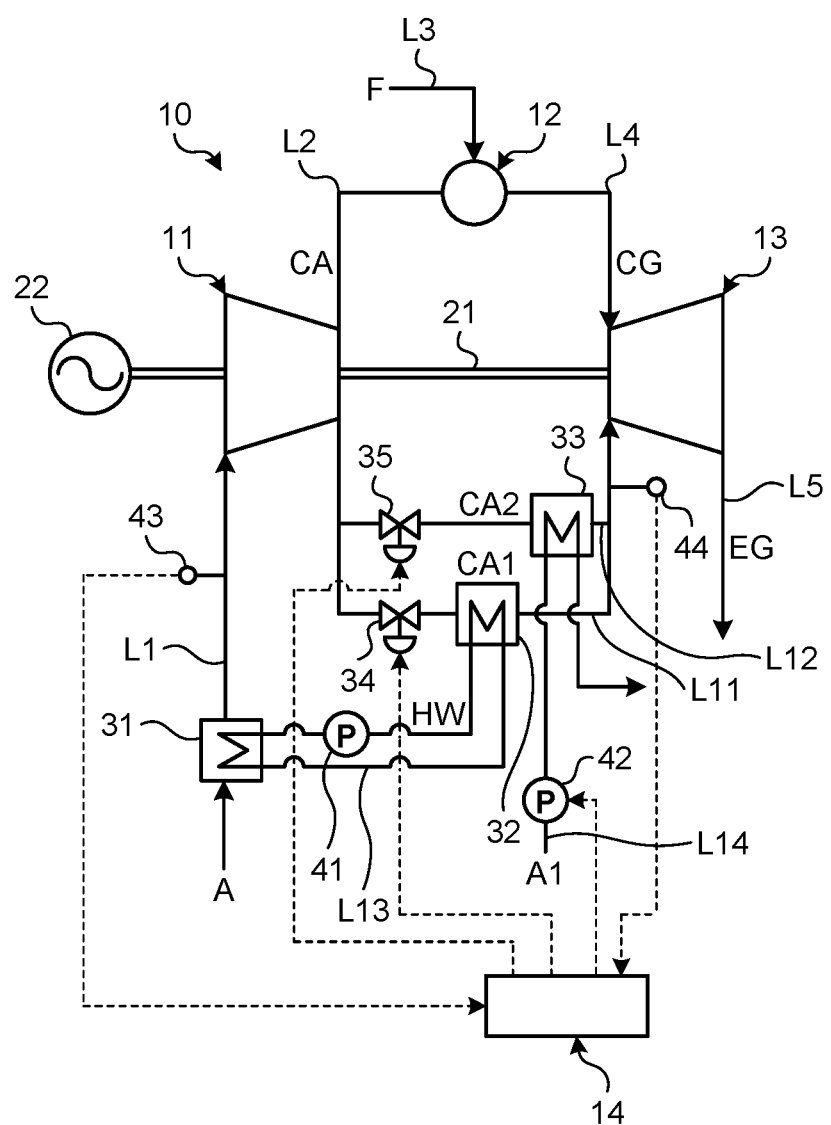
FIG. 1 is a schematic configuration diagram illustrating a gas turbine of a first embodiment.

FIG. 1 is a schematic configuration diagram illustrating a gas turbine of a first embodiment.

In the first embodiment, as illustrated in FIG. 1, a gas turbine 10 includes a compressor 11, a combustor 12, a turbine 13, and a control device 14.

The compressor 11 and the turbine 13 are integrally rotatably coupled with a rotating shaft 21, and a generator 22 is coupled to the rotating shaft 21. The compressor 11 compresses air A flowing from an air intake line L1. The combustor 12 mixes and combusts compressed air CA supplied from the compressor 11 through a compressed air supply line L2 and fuel F supplied from a fuel gas supply line L3. The turbine 13 is rotationally driven by combustion gas CG supplied from the combustor 12 through a combustion gas supply line L4. The generator 22 is driven by a rotational power transmitted by the rotation of the turbine 13. In addition, a flue gas discharge line L5 that discharges flue gas EG is coupled to the turbine 13.

Therefore, during the operation of the gas turbine 10, the compressor 11 compresses the air A, and the combustor 12 mixes and combusts the supplied compressed air CA and the fuel F. The turbine 13 is rotationally driven by the combustion gas CG supplied from the combustor 12, and the generator 22 generates electricity. The gas turbine 10 (turbine 13) discharges the flue gas EG.

In addition, the gas turbine 10 includes a first heat exchanger (for example, an intake air heater) 31, a second heat exchanger 32, a third heat exchanger 33, a first flow rate adjusting valve (heat exchange amount adjusting device) 34, and a second flow rate adjusting valve (heat exchange amount adjusting device) 35. In the first embodiment, the first heat exchanger 31 and the second heat exchanger 32 correspond to the air temperature adjusting heat exchanger of the present invention, and the third heat exchanger 33 corresponds to the compressed air cooling heat exchanger. In the first embodiment, heat is indirectly exchanged between the air A to be taken into the compressor 11 and the compressed air CA generated by the compressor 11 through a first medium.

The first heat exchanger 31 is provided in the air intake line L1. The first heat exchanger 31 exchanges heat between the air A taken from the air intake line L1 and the first medium (for example, hot water) HW. That is, the air A flowing through the air intake line L1 is heated with the first medium (for example, water) HW by the first heat exchanger 31 and then taken into the compressor 11.

A first cooling air supply line L11 and a second cooling air supply line L12 are provided in parallel between the compressor 11 and the turbine 13. The first cooling air supply line L11 and the second cooling air supply line L12 supplies part of the compressed air CA compressed by the compressor 11 to the turbine 13 as cooling air. One end portion of the first cooling air supply line L11 and one end portion of the second cooling air supply line L12 are joined together and coupled to a combustor casing chamber (not illustrated) of the compressor 11. The other end portions thereof are joined together and coupled to a high temperature portion of the turbine 13.

The second heat exchanger 32 is provided in the first cooling air supply line L11, and the third heat exchanger 33 is provided in the second cooling air supply line L12. In addition, a first flow rate adjusting valve 34 is provided on an upstream side of the second heat exchanger 32 in the first cooling air supply line L11. A second flow rate adjusting valve 35 is provided on an upstream side of the third heat exchanger 33 in the second cooling air supply line L12.

A first medium circulation line L13 is provided between the first heat exchanger 31 and the second heat exchanger 32. A circulation pump 41 is provided in the first medium circulation line L13. Therefore, the circulation pump 41 can be driven to circulate the first medium HW between the first heat exchanger 31 and the second heat exchanger 32 through the first medium circulation line L13. Then, the first medium HW circulating through the first medium circulation line L13 is heated with the compressed air CA1 in the second heat exchanger 32, which flows through the first cooling air supply line L11, to heat the air A in the first heat exchanger 31, which flows through the air intake line L1. Here, the second heat exchanger 32 is, for example, a turbine cooling air (TCA) cooler. The compressed air CA1 flowing through the first cooling air supply line L11 is cooled in the second heat exchanger 32 with the first medium HW circulating through the first medium circulation line L13.

The third heat exchanger 33 is provided in a second medium supply line L14. A supply pump 42 is provided in the second medium supply line L14. Here, the third heat exchanger 33 is, for example, a TCA cooler and may be a cooling tower. Therefore, the supply pump 42 is driven to cause a second medium (for example, air) A1 to flow through the second medium supply line L14. Then, compressed air CA2 flowing through the second cooling air supply line L12 is cooled in the third heat exchanger 33 with the second medium A1 flowing through the second medium supply line L14.

The first flow rate adjusting valve 34 and the second flow rate adjusting valve 35 function as heat exchange amount adjusting devices that adjust the amount of heat of the compressed air CA1 to be supplied to the second heat exchanger 32. That is, the compressed air CA compressed by the compressor 11 is partially supplied through the first cooling air supply line L11 and the second cooling air supply line L12 to the turbine 13 as cooling air. In a case in which an opening degree of the first flow rate adjusting valve 34 is increased and an opening degree of the second flow rate adjusting valve 35 is decreased, a large amount of the compressed air CA flows to the first cooling air supply line L11 side. Then, the amount of heat of the compressed air CA1 in the first cooling air supply line L11 increases, and the first medium HW circulating through the first medium circulation line L13 is heated in the second heat exchanger 32, so that the temperature is higher than before changing the opening degrees of the flow rate adjusting valves 34 and 36. As a result, the air A in the air intake line L1 is heated by the first heat exchanger 31 with the first medium HW that circulates through the first medium circulation line L13 and has a high temperature, so that the temperature of the air A is higher than before changing the opening degrees.

On the other hand, in a case in which the opening degree of the first flow rate adjusting valve 34 is decreased and the opening degree of the second flow rate adjusting valve 35 is increased, a large amount of the compressed air CA flows to the second cooling air supply line L12 side. Then, the amount of heat of the compressed air CA1 in the first cooling air supply line L11 decreases, and the first medium HW circulating through the first medium circulation line L13 is heated by the second heat exchanger 32, but the temperature is lower than before chancing the opening degrees of the flow rate adjusting valves 34 and 36. As a result, although the air A in the air intake line L1 is heated in the first heat exchanger 31 with the first medium HW that circulates through the first medium circulation line L13 and has a low temperature, the temperature of the air A is lower than before changing the opening degrees.

The control device 14 controls the first flow rate adjusting valve 34 and the second flow rate adjusting valve 35 as the heat exchange amount adjusting devices based on the temperature of the air A to be taken into the compressor 11. A first temperature sensor 43 is provided on a downstream side of the first heat exchanger 31 in the air intake line L1. The first temperature sensor 43 measures the temperature of the air A that flows through the air intake line L1 and is heated in the first heat exchanger 31, and outputs the measured temperature to the control device 14. The control device 14 adjusts the opening degrees of the first flow rate adjusting valve 34 and the second flow rate adjusting valve 35 so that the temperature of the air A measured by the first temperature sensor 43 reaches a target temperature.

In addition, the control device 14 controls the supply pump 42 based on a temperature of the compressed air CA (CA1+CA2) as cooling air to be supplied to the turbine 13. A second temperature sensor 44 is provided in the joined line on a downstream side of the second heat exchanger 32 and the third heat exchanger 33 in the cooling air supply lines L11 and L12. The second temperature sensor 44 measures the temperature of the compressed air CA (CA1+CA2) that flows through the cooling air supply lines L11 and L12 and is supplied to the turbine 13, and outputs the measured temperature to the control device 14. The control device 14 adjusts a rotation speed of the supply pump 42 so that the temperature of the compressed air CA (CA1+CA2) measured by the second temperature sensor 44 reaches a target temperature.

The compressed air CA (CA1+CA2) supplied from the cooling air supply lines L11 and L12 to the turbine 13 is used to cool rotors and rotor blades, which are not illustrated. Therefore, it is necessary to maintain the temperature of the compressed air CA (CA1+CA2) to be supplied to the turbine 13 at a predetermined cooling temperature required for cooling. That is, the rotation speed of the supply pump 42 is adjusted so that the temperature of the compressed air CA (CA1+CA2) to be supplied to the turbine 13 is cooled to the predetermined cooling temperature, and the amount of heat removed from the compressed air CA2 flowing through the second cooling air supply line L12 is adjusted.

Figure 2:
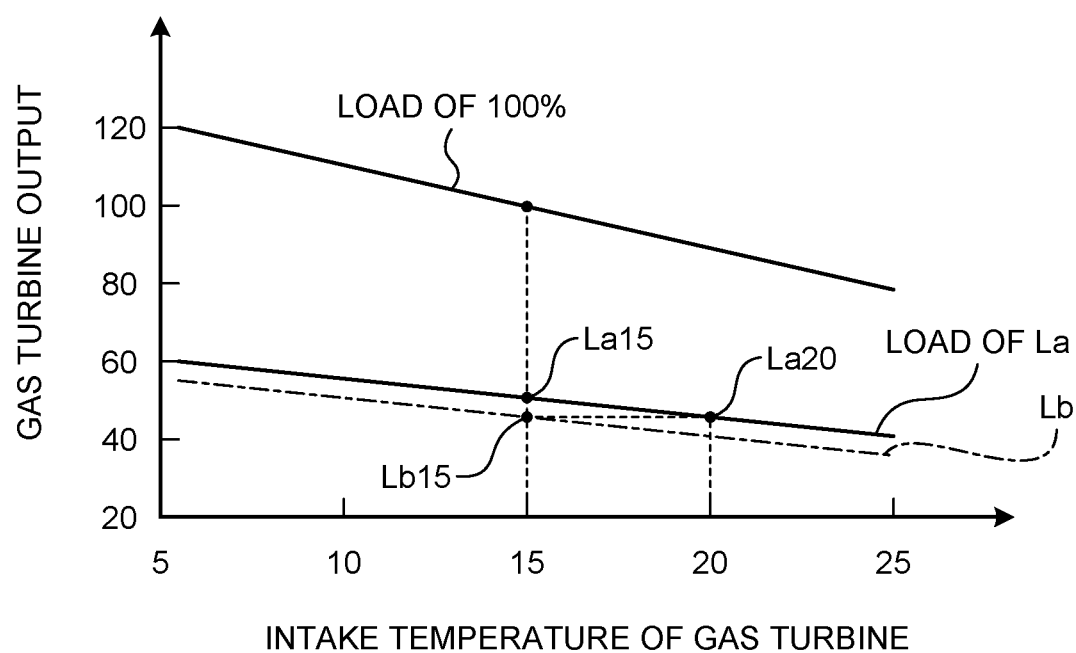
FIG. 2 is a graph illustrating a as turbine output with respect to an intake temperature of the gas turbine.

Here, the control method of the gas turbine 10 will be described. FIG. 2 is a graph illustrating a gas turbine output with respect to an intake temperature of the gas turbine.

As illustrated in FIG. 2, the gas turbine output tends to be reduced as the intake temperature of the gas turbine is increased. Here, the intake temperature of the gas turbine is a temperature of the air to be taken into the compressor 11, and is a temperature measured by the first temperature sensor 43. The gas turbine output is the amount of power generated by the generator 22 coupled to the gas turbine 10.

In general, in the gas turbine 10, an operable region with respect to the gas turbine output is set, an upper limit value is a load of 100%, and a lower limit value is a load of La %. In a case in which the supplying amount of the fuel F to the combustor 12 is reduced, the gas turbine output is reduced. In a case in which the supplying amount of the fuel F is reduced, a combustion temperature decreases, and the amount of hazardous substances (for example, NOx) generated increases. The load of La % as the lower limit value is set based on the regulated amount of the hazardous substances.

For example, in a case in which the intake temperature of the gas turbine is 15° C. and the gas turbine output at the load of 100% is 100 MW, the load of La % is 50 MW (La 15). In this case, in a case in which the air A to be taken into the compressor 11 is heated by the first heat exchanger 31, the intake temperature of the gas turbine increases to 20° C. Then, the gas turbine output at the load of La % is 45 MW (La 20). The gas turbine output 45 MW (La 20) at this load of La % is the same as the gas turbine output 45 MW (Lb 15) at a load of Lb % in a case in which the intake temperature of the gas turbine is 15° C. Therefore, the lower limit value in the operable region of the gas turbine 10 is reduced from the load of La % to the load Lb %, the operable region can be expanded within a range from the load of 100% (100 MW) to the load of Lb % (45 MW).

The gas turbine of the first embodiment includes the compressor 11 that compresses the air A, the combustor 12 that mixes and combusts the compressed air CA compressed by the compressor 11 and the fuel F, the turbine 13 that obtains rotational power using the combustion gas CG generated by the combustor 12, the compressed air cooling heat exchanger (the third heat exchanger 33) that cools the compressed air CA to produce cooling air for the turbine, the air temperature adjusting heat exchangers (the first and second heat exchangers 31 and 32) that exchange heat between the air A and the compressed air CA, the heat exchange amount adjusting device that adjusts the heat exchange amount of each of the compressed air cooling heat exchanger and the air temperature adjusting heat exchangers, and the control device 14 that controls the heat exchange amount adjusting device, in which the control device 14 controls the heat exchange amount adjusting device based on a temperature of the air A to be taken into the compressor 11.

Therefore, the air temperature adjusting heat exchanger exchanges heat between the air A and the compressed air CA, so that the air A is heated with the compressed air CA, and the air A whose temperature has increased by heating is taken into the compressor 11. In this case, the control device 14 adjusts the heat exchange amount of the air temperature adjusting heat exchanger by the heat exchange amount adjusting device based on the temperature of the air A to be taken into the compressor 11. That is, in a case in which the heat exchange amount of the air temperature adjusting heat exchanger is adjusted, a temperature of the air A heated with the compressed air CA is adjusted. Here, since an output of the gas turbine 10 changes depending on the temperature of the air A to be taken into the compressor 11, the output of the gas turbine 10 can be adjusted to a target output with high accuracy regardless of a load of the gas turbine 10, and an operation region can be expanded by the single gas turbine 10.

In addition, in the first embodiment, the air A to be taken into the compressor 11 is heated with the compressed air CA that is compressed by the compressor 11 and used as cooling air for the turbine 13. In this case, the compressed air CA that has heated the air A is cooled with the air A and transmitted to the turbine 13, so that the compressed air CA is not discarded. Therefore, the heat of the compressed air CA that is used as the cooling air for the turbine 13 can be efficiently recovered by the air A.

In the gas turbine of the first embodiment, the first temperature sensor 43 that measures a temperature of the air A heat-exchanged by the air temperature adjusting heat exchanger is provided, and the control device 14 controls the heat exchange amount in the air temperature adjusting heat exchanger by the heat exchange amount adjusting device so that the temperature of the air A measured by the first temperature sensor 43 approaches a target temperature. Therefore, the temperature of the air A to be taken into the compressor 11 can be controlled with high accuracy.

In the gas turbine of the first embodiment, the second temperature sensor 44 that measures a temperature of the compressed air CA cooled by the third heat exchanger 33 is provided, and the control device 14 controls the heat exchange amount in the third heat exchanger 33 by the heat exchange amount adjusting device so that the temperature of the compressed air CA measured by the second temperature sensor 44 is maintained at a target temperature. Therefore, the temperature of the compressed air CA as cooling air to be supplied to the turbine 13 can be controlled with high accuracy.

In the gas turbine of the first embodiment, the air temperature adjusting heat exchanger includes the first heat exchanger 31 that exchanges heat between the air A and the first medium HW, and the second heat exchanger 32 that exchanges heat between the compressed air CA and the first medium HW, and the heat exchange amount adjusting device adjusts a heat exchange amount in the second heat exchanger. Therefore, the second heat exchanger 32 exchanges heat between the compressed air CA and the first medium HW to heat the first medium with the compressed air CA, the first heat exchanger 31 exchanges heat between the air A and the first medium HW to heat the air A with the first medium HW, and the air A whose temperature has increased by heating is taken into the compressor 11. In this case, the control device 14 adjusts the amount of heat of the compressed air CA to be supplied to the second heat exchanger 32 by the heat exchange amount adjusting device based on the temperature of the air A to be taken into the compressor. That is, the amount of heat of the compressed air CA is adjusted to increase the temperature of the air A through the first medium HW and the temperature of the air A to be taken into the compressor 11 can be controlled with high accuracy.

In the gas turbine of the first embodiment, the first cooling air supply line L11 and the second cooling air supply line L12 that are used to supply the compressed air CA compressed by the compressor 11 to the turbine 13 as cooling air are provided in parallel, the second heat exchanger 32 is provided in the first cooling air supply line L11, the third heat exchanger 33 that exchanges heat between the compressed air CA and the second medium A1 is provided in the second cooling air supply line L12, and the flow rate adjusting valves 34 and 35 are provided as the heat exchange amount adjusting devices in the first cooling air supply line L11 and the second cooling air supply line L12, respectively. Therefore, opening degrees of the flow rate adjusting valves 34 and 35 are adjusted to adjust a flow rate of the compressed air CA flowing through the first cooling air supply line L11, so that the amount of heat supplied from the compressed air CA to the first medium HW can be adjusted by the second heat exchanger 32 provided in the first cooling air supply line L11, and the temperature of the air A to be taken into the compressor 11 can be adjusted by the first medium HW with high accuracy.

In addition, since the third heat exchanger 33 exchanges heat between the compressed air CA and the second medium A1 such as air, and a, material that exists in the vicinity is used, it is possible to shorten a length of a pipe to be used and contribute the miniaturization of equipment and the decrease in cost.

The flow rate adjusting valves 34 and 35 are provided as the heat exchange amount adjusting devices in both the first cooling air supply line L11 and the second cooling air supply line L12, but the flow rate adjusting valves 34 and 35 may be provided in any one of the first cooling air supply line L11 and the second cooling air supply line L12. The flow rate of the compressed air CA flowing through the first cooling air supply line L11 can be directly adjusted by the flow rate adjusting valve 34 being provided in only the first cooling air supply line L11. In addition, the flow rate of the compressed air CA flowing through the second cooling air supply line L12 is adjusted by the flow rate adjusting valve 35 being provided in only the second cooling air supply line L12, so that the flow resistance of the compressed air CA fluctuates. Thus, the flow rate of the compressed air CA flowing through the first cooling air supply line L11 can be indirectly adjusted.

In the gas turbine of the first embodiment, the second medium A1 is air. Therefore, it is possible to shorten a length of a pipe to be used, achieve the miniaturization of equipment, and suppress the increase in cost by using air that exists in the vicinity.

In the gas turbine of the first embodiment, the third heat exchanger 33 is a cooling tower. Therefore, the structure can be simplified.

In addition, the control method of the gas turbine of the first embodiment includes a step of cooling the compressed air CA to be supplied to the turbine 13, a step of increasing a temperature of the air A with the compressed air CA, and a step of adjusting the amount of heat of the compressed air CA, which increases a temperature of the air A based on a temperature of the air A to be taken into the compressor 11.

Therefore, in a case in which the amount of heat of the compressed air CA is adjusted, a temperature of the air A heated with the compressed air is adjusted. Here, since an output of the gas turbine 10 changes depending on the temperature of the air to be taken into the compressor 11, the output of the gas turbine 10 can be adjusted to a target output with high accuracy regardless of a load of the gas turbine 10.

Second Embodiment

Figure 3:
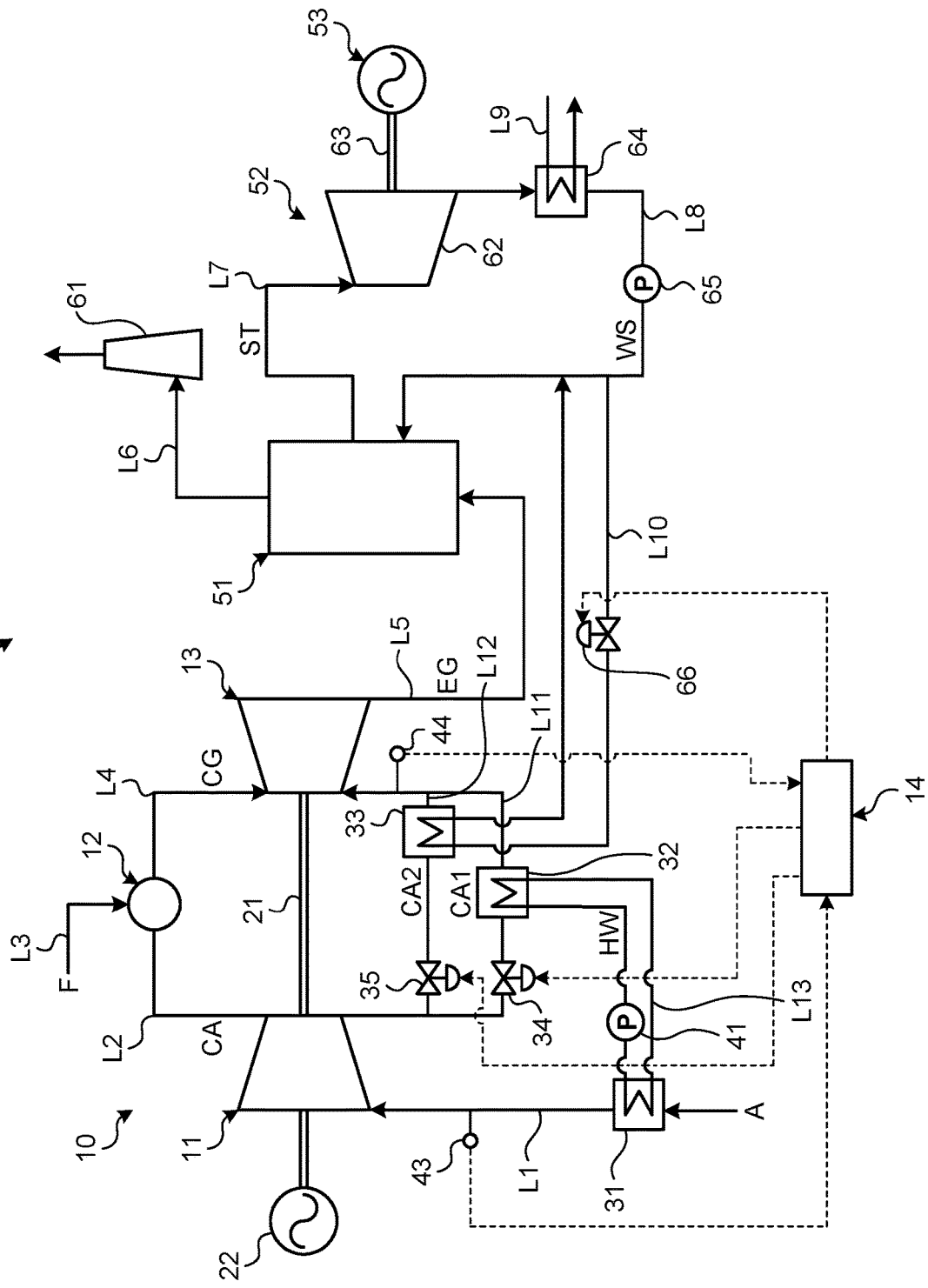
FIG. 3 is a schematic configuration diagram illustrating a combined plant of a second embodiment.

FIG. 3 is a schematic configuration diagram illustrating a combined plant of a second embodiment. Members having the same functions as those of the first embodiment described above are designated by the same reference numerals, and detailed descriptions thereof will be omitted.

In the second embodiment, as illustrated in FIG. 3, a combined cycle plant 50 includes the gas turbine 10, a heat recovery steam generator (HRSG) 51, a steam turbine 52, and a generator 53.

The gas turbine 10 includes the compressor 11, the combustor 12, the turbine 13, and the control device 14. Since the gas turbine 10 is substantially the same as the first embodiment described above, the descriptions thereof will be omitted.

The heat recovery steam generator 51 generates steam (superheated steam) ST by exhausted heat of the flue gas EG discharged from the gas turbine 10 (turbine 13) through the flue pas discharge line L5. Although not illustrated, the heat recovery steam generator 51 includes a superheater, an evaporator, and an economizer as heat exchangers. The heat recovery steam generator 51 recovers heat in the order of the superheater, the evaporator, and the economizer by passing the flue gas EG from the gas turbine 10 through the inside of the heat recovery steam generator 51 to generate the steam ST. The heat recovery steam generator 51 coupled to a stack 61 through a flue gas discharge line L6 that discharges the used flue gas EG that has generated the steam ST.

The steam turbine 52 is driven by the steam ST generated by the heat recovery steam generator 51, and includes a turbine 62. In the turbine 62, for example, a high-pressure turbine, a medium-pressure turbine, and a low-pressure turbine are integrally rotatably coupled with a rotating shaft. The generator 53 is coupled to the turbine 62 with a rotating shaft 63. A steam supply line L7 that is used to supply the steam ST in the heat recovery steam generator 51 to the turbine is provided. In the steam turbine 52, the turbine 62 is rotated by the steam ST from the heat recovery steam generator 51, and the generator 53 is driven by rotational power transmitted by the turbine 62 being rotated.

The steam turbine 52 is provided with a condenser 64 for cooling the steam ST that drives the turbine 62. The condenser 64 cools the steam discharged from the turbine 62 with cooling water (for example, seawater) to produce condensed water. The condenser 64 transmits the generated condensed water as a water supply WS to the heat recovery steam generator 51 through a water supply line L8. A condensate pump 65 is provided in the water supply line L8. In addition, the condenser 64 is provided with a cooling water line L9 for cooling the steam ST with cooling water.

The water supply line L8 is provided with a water supply circulation line (second medium supply line) 110 that branches from between the condensate pump 65 and the heat recovery steam generator 51. The water supply circulation line L10 extends from the water supply line L8, passes through the third heat exchanger 33, and returns to the water supply line L8. A flow rate adjusting valve 66 is provided in the water supply line L8. Therefore, an opening degree of the flow rate adjusting valve 66 is adjusted to circulate part of the water supply WS flowing in the water supply line L8 through the water supply circulation line L10 as a second medium. Then, the compressed air CA2 flowing through the second cooling air supply line L12 is cooled in the third heat exchanger 33 by the water supply WS flowing through the water supply circulation line L10. It is not limited that the water supply circulation line L10 extending toward the third heat exchanger 33 is provided with the water supply line L8 that branches at this position. For example, the water supply circulation line L10 may be provided to branch from an internal system of the heat recovery steam generator 51. In addition, a returning destination of the water supply circulation line L10 is not limited to an upstream side of the heat recovery steam generator 51, and the water supply circulation line L10 may return to the internal system of the heat recovery steam generator 51.

Therefore, during the operation of the combined cycle plant 50, the compressor 11 compresses the air A in the gas turbine 10, and the combustor 12 mixes and combusts the compressed air CA supplied and the fuel F. The turbine 13 is rotationally driven by the combustion gas CG supplied from the combustor 12, and the generator 22 generates electricity. In addition, the flue gas EG discharged from the gas turbine 10 (turbine 13) is transmitted to the heat recovery steam generator 51, the heat recovery steam generator 51 generates the steam ST, and the steam ST is transmitted to the steam turbine 52. In the steam turbine 52, the turbine 62 rotationally driven by the steam ST, and the generator 53 generates electricity. The steam ST used in the turbine 62 is cooled by the condenser 64 to be condensed water, and returns to the heat recovery steam generator 51 as the water supply WS.

The control device 14 controls the first flow rate adjusting valve 34 and the second flow rate adjusting valve 35 as the heat exchange amount adjusting devices based on the temperature of the air A to be taken into the compressor 11. That is, the control device 14 adjusts opening degrees of the first flow rate adjusting valve 34 and the second flow rate adjusting valve 35 so that the temperature of the air A measured by the first temperature sensor 43 reaches a target temperature.

In addition, the control device 14 controls the opening degree of the flow rate adjusting valve 66 based on a temperature of the compressed air CA (CA1+CA2) as cooling air to be supplied to the turbine 13. The control device 14 adjusts the opening degree of the flow rate adjusting valve 66 so that the temperature of the compressed air CA (CA1+CA2) measured by a second temperature sensor 44 reaches a target temperature, and the amount of heat removed from the compressed air CA2 flowing through the second cooling air supply line L12 is adjusted.

Here, a control of the gas turbine 10 in the combined cycle plant 50 will be described.

In a case in which it is desired to shift the gas turbine 10 in an operating state with a load of 100% (gas turbine output of 100 MW) into an operating state with a partial load (gas turbine output of 45 MW), the control device 14 reduces the amount of the fuel F to be supplied to the combustor 12.

Then, the operating state of the gas turbine 10 is lowered to an operating state (gas turbine output of 50 MW) at a load of La %.

The control device 14 increases the intake temperature of the gas turbine. In this case, the temperature of the air A that flows through the air intake line L1 and is heated by the first heat exchanger 31 is input to the control device 14 from the first temperature sensor 43, and the opening degrees of the first flow rate adjusting valve 34 and the second flow rate adjusting valve 35 are adjusted so that the temperature measured by the first temperature sensor 43 reaches a target temperature. In a case in which the control device 14 adjusts the opening degrees of the first flow rate adjusting valve 34 and the second flow rate adjusting valve 35 to increase the flow rate of compressed air CA1 flowing to the first cooling air supply line L11 side, a temperature of the first medium HW is increased, and the temperature of air A, that is, the intake temperature of the gas turbine is increased to the target temperature. As a result, the output of the gas turbine 10 is reduced to 45 MW at a load of La %.

In addition, the control device 14 controls the flow rate adjusting valve 66 based on a temperature of the compressed air CA (CA1+CA2) as cooling air to be supplied to the turbine 13. The control device 14 adjusts the opening degree of the flow rate adjusting valve 66 so that the temperature of the compressed air CA (CA1+CA2) measured by the second temperature sensor 44 reaches a target temperature. Then, a flow rate of the water supply WS to be supplied to the third heat exchanger 33 is adjusted, and a temperature of the compressed air CA2 cooled by the water supply WS is adjusted by the third heat exchanger 33. As a result, the compressed air CA (CA1+CA2) cooled to an appropriate temperature can be supplied to the turbine 13, and the turbine 13 can be appropriately cooled.

As described above, in the gas turbine or the second embodiment, the second heat exchanger 32 is provided in the first cooling air supply line L11, the third heat exchanger 33 that exchanges heat between the compressed air CA and the water supply WS is provided in the second cooling air supply line L12, and the control device 14 controls the heat exchange amount adjusting devices based on a temperature of the air A to be taken into the compressor 11. Therefore, an output of the gas turbine 10 can be adjusted to a target output with high accuracy regardless of a load of the gas turbine 10, and an operation region can be expanded by the single gas turbine 10.

In the gas turbine of the second embodiment, the second medium is used as the water supply WS that returns to the heat recovery steam generator 51. Therefore, the increase in cost can be suppressed by using the water supply WS existing in the vicinity.

In addition, the combined cycle plant of the second embodiment is provided with the gas turbine 10, the heat recovery steam generator 51 that generates the steam ST by exhausted heat of the flue gas EG discharged from the gas turbine 10, and the steam turbine 52 that includes the turbine 62 driven by the steam ST generated by the heat recovery steam generator 51. Therefore, regardless of the load of the gas turbine 10, an output of the combined cycle plant 50 in which the gas turbine 10 is combined with the steam turbine 52 can be adjusted to a target output. Since a change rate of the steam turbine 52 during heating of the intake air is smaller than a change rate of the output of the gas turbine 10, the operation region in the combined cycle plant 50 can be expanded by the output adjustment of the gas turbine 10 during the combined cycle operation.

Third Embodiment

Figure 4:
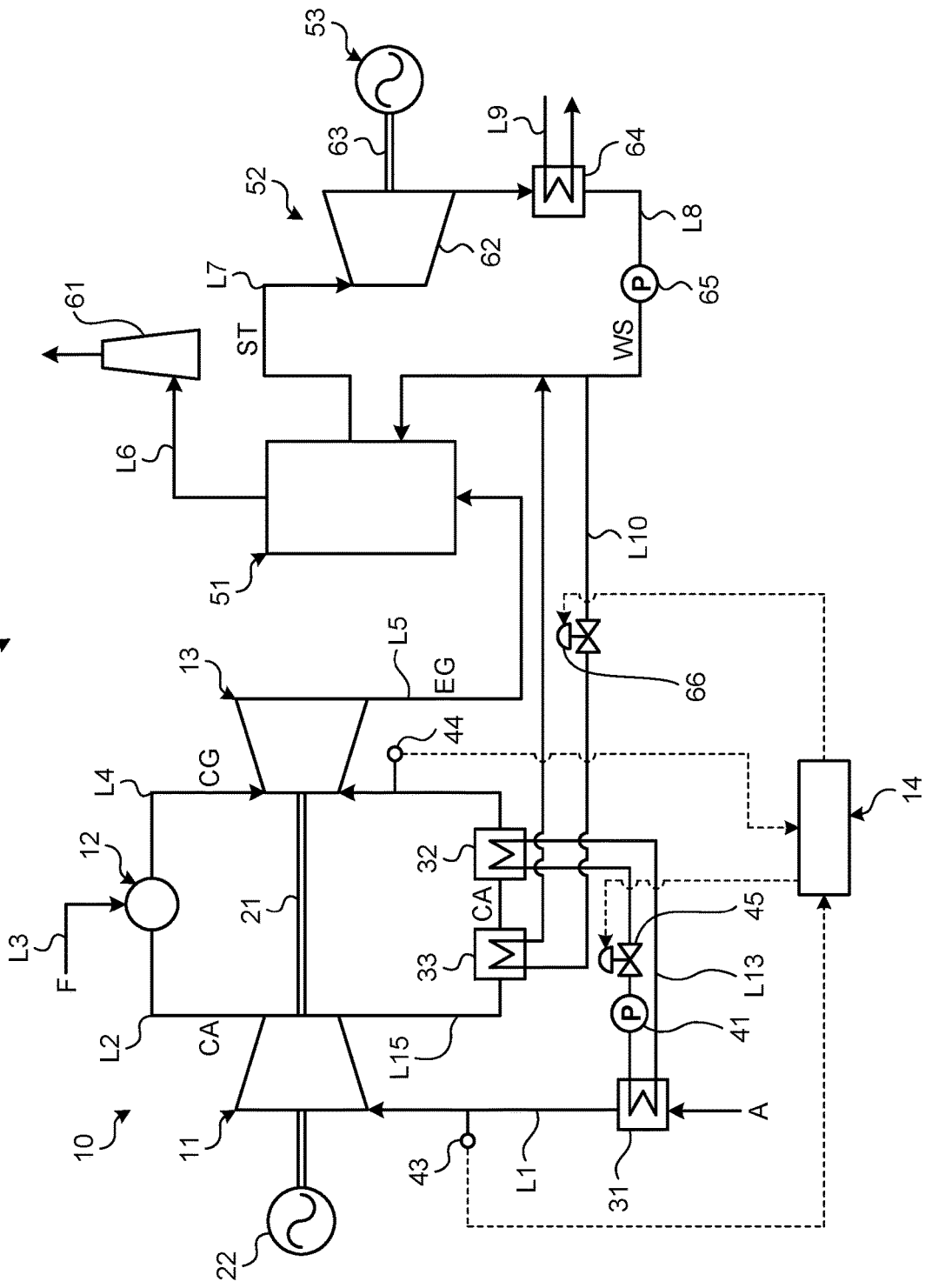
FIG. 4 is a schematic configuration diagram illustrating a combined plant of a third embodiment.

FIG. 4 is a schematic configuration diagram illustrating a combined plant of a third embodiment. Members having the same functions as those of the second embodiment described above are designated by the same reference numerals, and detailed descriptions thereof will be omitted.

In the third embodiment, as illustrated in FIG. 4, a cooling air supply line L15 is provided between the compressor 11 and the turbine 13. The cooling air supply line L15 is used to supply part of the compressed air CA compressed by the compressor 11 to the turbine 13 as cooling air. One end portion of the cooling air supply line L15 is coupled to the combustor casing chamber (not illustrated) of the compressor 11, and the other end portion is coupled to a space formed inside a rotor (not illustrated) of the turbine 13.

The second heat exchanger 32 and the third heat exchanger 33 are provided in the cooling air supply line L15 in series. The third heat exchanger 33 is provided on an upstream side of the cooling air supply line L15 in a direction where the compressed air CA flows, and the second heat exchanger 32 is provided on a downstream side.

A first medium circulation line L13 is provided between the first heat exchanger 31 and the second heat exchanger 32. A circulation pump 41 and a flow rate adjusting valve 45 are provided in the first medium circulation line L13. The third heat exchanger 33 is provided in a water supply circulation line L10.

The control device 14 controls the first flow rate adjusting valve 45 as the heat exchange amount adjusting device based on the temperature of the air A to be taken into the compressor 11. The control device 14 adjusts the opening degree of the flow rate adjusting valve 45 so that the temperature of the air A measured by the first temperature sensor 43 reaches a target temperature.

Here, a control of the gas turbine 10 in the combined cycle plant 50 will be described.

In a case in which it is desired to shift the gas turbine 10 in an operating state with a load of 100% (gas turbine output of 100 MW) into an operating state with a partial load (gas turbine output of 45 MW), the control device 14 reduces the amount of the fuel F to be supplied to the combustor 12. Then, the operating state of the gas turbine 10 is lowered to an operating state (gas turbine output of 50 MW) at a load of La %.

The control device 14 increases the intake temperature of the gas turbine. In this case, the temperature of the air A that flows through the air intake line L1 and is heated by the first heat exchanger 31 is input to the control device 14 from the first temperature sensor 43, and the opening degree of the flow rate adjusting valve 45 is adjusted so that the temperature measured by the first temperature sensor 43 reaches a target temperature. In a case in which the control device 14 adjusts the opening degree of the flow rate adjusting valve 45 to increase the flow rate of the first medium HW flowing through the first medium circulation line L13, the heat exchange amount from the first medium HW to the air A is increased by the first heat exchanger 31 to increase the temperature, and the temperature of air A, that is, the intake temperature of the gas turbine is increased to a target temperature. As a result, the output of the gas turbine 10 is reduced to 45 MW at a load of La %.

In addition, the control device 14 controls the flow rate adjusting valve 66 based on the temperature of the compressed air CA as cooling air to be supplied to the turbine 13. The control device 14 adjusts the opening degree of the flow rate adjusting valve 66 so that the temperature of the compressed air CA measured by the second temperature sensor 44 reaches a target temperature. Then, a flow rate of the water supply WS to be supplied to the third heat exchanger 33 is adjusted, and a temperature of the compressed air CA cooled by the water supply WS is adjusted by the third heat exchanger 33. As a result, the compressed air CA at an appropriate temperature can be supplied to the turbine 13, and the turbine 13 can be appropriately cooled.

As described above, in the gas turbine of the third embodiment, the cooling air supply line L15 that is used to supply the compressed air CA compressed by the compressor 11 to the turbine 13 as cooling air is provided, the second heat exchanger 32 and the third heat exchanger 33 are provided in the cooling air supply line L15 in series, and the flow rate adjusting valve 45 is provided as the heat exchange amount adjusting device in the first medium circulation line L13 through which the first medium HW circulates between the first heat exchanger 31 and the second heat exchanger 32.

Therefore, the opening degree of the flow rate adjusting valve 45 is adjusted to adjust a flow rate of the first medium HW flowing through the first medium circulation line L13, so that the amount of heat supplied from the compressed air CA to the first medium HW can be adjusted by the second heat exchanger 32 provided in the cooling air supply line L15, and the temperature of the air A to be taken into the compressor 11 can be adjusted by the first medium HW with high accuracy.

Here, in the second and third embodiments described above, the third heat exchanger 33 is, for example, a TCA cooler and may be a cooling tower.

Fourth Embodiment

Figure 5:
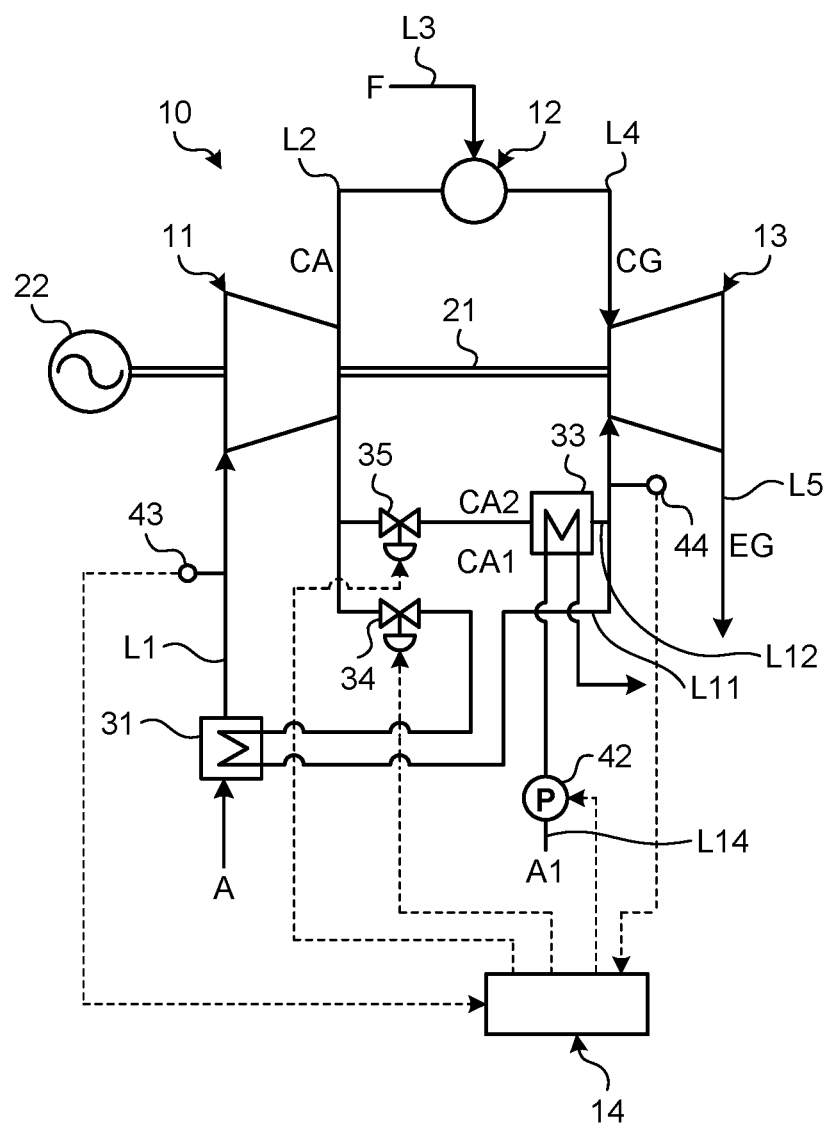
FIG. 5 is a schematic configuration diagram illustrating a gas turbine of a fourth embodiment.

FIG. 5 is a schematic configuration diagram illustrating a gas turbine of a fourth embodiment. Members having the same functions as those of the embodiments described above are designated by the same reference numerals, and detailed descriptions thereof will be omitted.

In the fourth embodiment, as illustrated in FIG. 5, the gas turbine 10 includes the first heat exchanger 31, the third heat exchanger 33, the first flow rate adjusting valve 34, and the second flow rate adjusting valve 35. In the fourth embodiment, the first heat exchanger 31 corresponds to the air temperature adjusting heat exchanger of the present invention, and directly exchanges heat between the air A to be taken into the compressor 11 and the compressed air CA generated by the compressor 11.

The first heat exchanger 31 is provided in the air intake line L1. A first cooling air supply line L11 and a second cooling air supply line L12 are provided in parallel between the compressor 11 and the turbine 13. The first heat exchanger 31 is provided in the first cooling air supply line L11, and the third heat exchanger 33 is provided in the second cooling air supply line L12. Therefore, the air A flowing through the air intake line L1 is heated with the compressed air CA1 flowing through the first cooling air supply line L11 by the first heat exchanger 31, and the compressed air CA1 is cooled.

The first flow rate adjusting valve 34 is provided on an upstream side of the first heat exchanger 31 in the first cooling air supply line L11. A second flow rate adjusting valve 35 is provided on an upstream side of the third heat exchanger 33 in the second cooling air supply line L12. The first flow rate adjusting valve 34 and the second flow rate adjusting valve 35 function as heat exchange amount adjusting devices that adjust the amount of heat of the compressed air CA1 to be supplied to the first heat exchanger 31. The control device 14 controls the first flow rate adjusting valve 34 and the second flow rate adjusting valve 35 as the heat exchange amount adjusting devices based on the temperature of the air A to be taken into the compressor 11. The first temperature sensor 43 measures the temperature of the air A that flows through the air intake line L1 and is heated by the first heat exchanger 31, and the control device 14 adjusts the opening degrees of the first flow rate adjusting valve 34 and the second flow rate adjusting valve 35 so that the temperature of the air A measured by the first temperature sensor 43 reaches a target temperature.

As described above, the gas turbine of the fourth embodiment includes the first heat exchanger 31 that directly exchanges heat between the air A and the compressed air CA, the heat exchange amount adjusting devices that adjust the amount of heat of the compressed air CA to be supplied to the first heat exchanger 31, and the control device 14 that controls the heat exchange amount adjusting devices based on a temperature of the air A to be taken into the compressor 1.

Here, since an output of the gas turbine 10 changes depending on the temperature of the air A to be taken into the compressor 11, the output of the gas turbine 10 can be adjusted to a target output regardless of a load of the gas turbine 10, and an operation region can be expanded by the single gas turbine 10. In addition, since heat exchange is directly carried out between the air A to be taken into the compressor 11 and the compressed air CA generated by the compressor 11, the system can be simplified.

Fifth Embodiment

Figure 6:
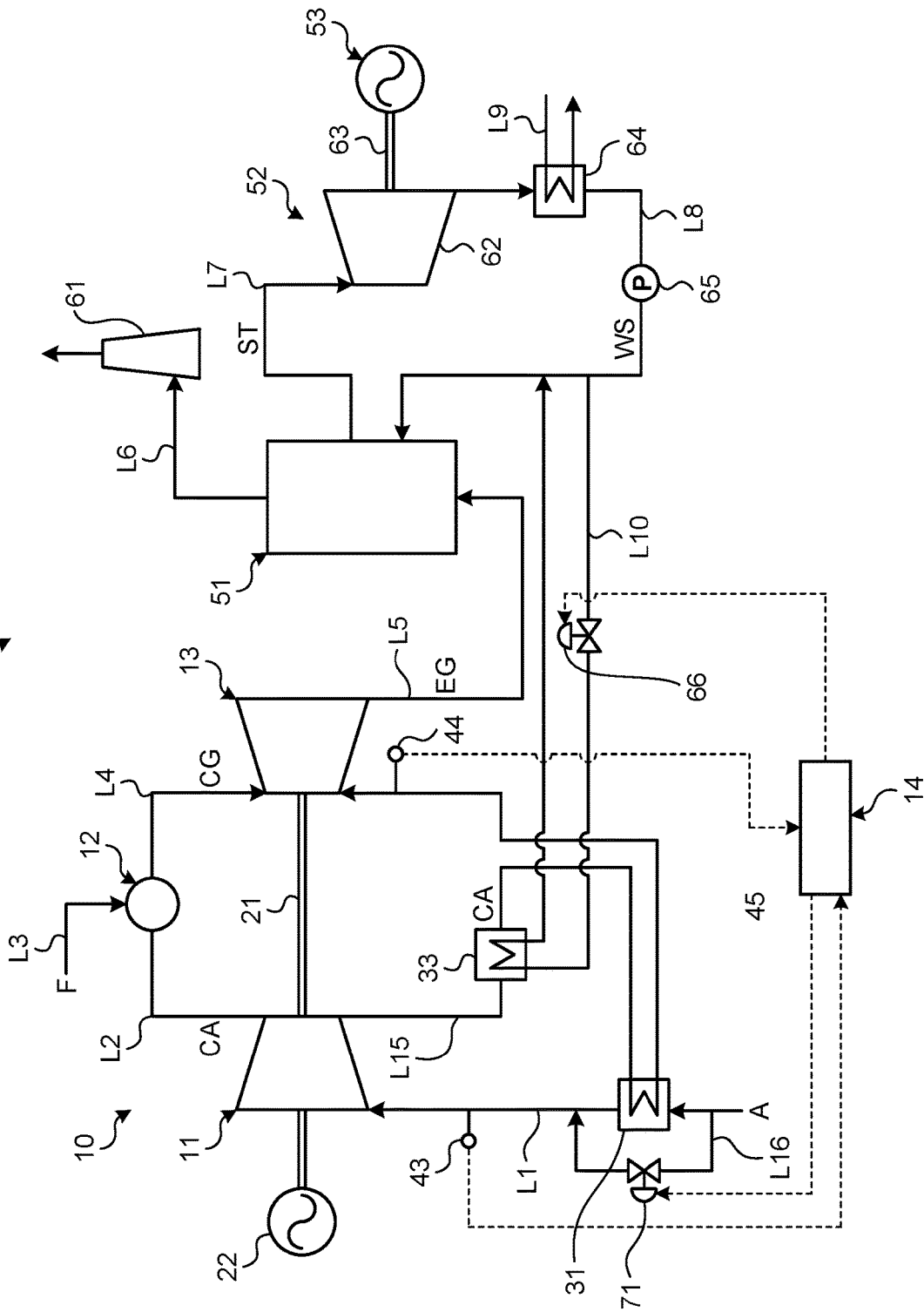
FIG. 6 is a schematic configuration diagram illustrating a combined plant of a fifth embodiment.

FIG. 6 is a schematic configuration diagram illustrating a combined plant of a fifth embodiment. Members having the same functions as those of the embodiments described above are designated by the same reference numerals, and detailed descriptions thereof will be omitted.

In the fifth embodiment, as illustrated in FIG. 6, the gas turbine 10 includes the first heat exchanger 31, the third heat exchanger 33, and the heat exchange amount adjusting devices. In the fifth embodiment, the first heat exchanger 31 corresponds to the air temperature adjusting heat exchanger of the present invention, and directly exchanges heat between the air A to be taken into the compressor 11 and the compressed air CA generated by the compressor 11.

The cooling air supply line L15 is provided between the compressor 11 and the turbine 13. The first heat exchanger 31 and the third heat exchanger 33 are provided in the cooling air supply line L15 in series. That is, the first heat exchanger 31 is provided in the cooling air supply line L15, and the third heat exchanger 33 is provided on an upstream side. The third heat exchanger 33 is provided in the water supply circulation line L10, and the flow rate adjusting valve 66 is provided in the water supply circulation line L10. In addition, as the heat exchange amount adjusting devices, an air bypass line L16 and a flow rate adjusting valve 71 are provided. One end portion of the air bypass line L16 is coupled to an upstream side of the first heat exchanger 31 in the air intake line L1, and the other end portion is coupled to a downstream side of the first heat exchanger 31 in the air intake line L1. The flow rate adjusting valve 71 is provided in the air bypass line L16.

The control device 14 controls the first flow rate adjusting valves 66 and 71 as the heat exchange amount adjusting devices based on the temperature of the air A to be taken into the compressor 11. The control device 14 adjusts the opening degrees of the flow rate adjusting valves 66 and 71 so that the temperature of the air A measured by the first temperature sensor 43 reaches a target temperature. That is, in a case in which it not necessary to adjust the temperature of the air A to be taken into the compressor 11, the control device 14 causes the air A to be supplied from the air bypass line L16 to the compressor 11 by the flow rate adjusting valve 71 being opened without the air A passing through the first heat exchanger 31.

As described above, in the gas turbine of the fifth embodiment, the first heat exchanger 31 and the third heat exchanger 33 are provided in the cooling air supply line L15 in series, and the flow rate adjusting valve 66 is provided as the heat exchange amount adjusting device in the water supply circulation line L10 as the second medium supply line through which the water supply WS circulates as the second medium in the third heat exchanger 33.

Therefore, the opening degree of the flow rate adjusting valve 66 is adjusted to adjust a flow rate of the water supply WS flowing through the water supply circulation line L10, so that the amount of heat supplied from the compressed air CA to the water supply WS can be adjusted by the third heat exchanger 33 provided in the cooling air supply line L15, and the temperature of the air A to be taken into the compressor 11 can be adjusted by the compressed air CA with high accuracy.

In the gas turbine of the fifth embodiment, as the heat exchange amount adjusting devices, the air bypass line L16 that bypasses the first heat exchanger 31 and supplies the air A to the compressor 11, and the flow rate adjusting valve 71 provided in the air bypass line L16 are provided. Therefore, in a case in which it is not necessary to adjust the temperature of the air A to be taken into the compressor 11, the air A can be supplied from the air bypass line L16 to the compressor 11 by the flow rate adjusting valve 71 without the air passing through the first exchanger 31. Here, in the fifth embodiment described above, the third heat exchanger 33 is, for example, a TCA cooler and may be a cooling tower.

Sixth Embodiment

Figure 7:
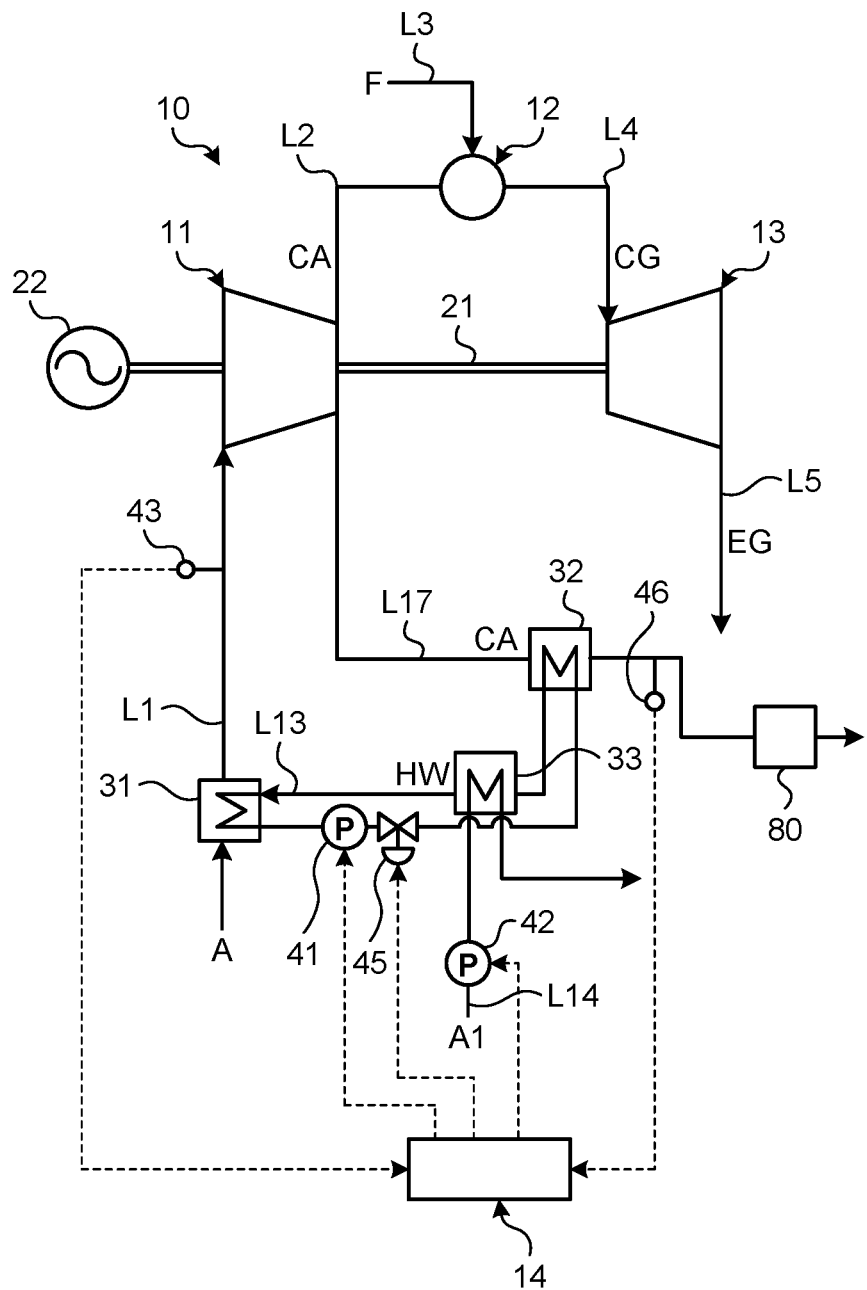
FIG. 7 is a schematic configuration diagram illustrating a gas turbine of a sixth embodiment.

FIG. 7 is a schematic configuration diagram illustrating a gas turbine of a sixth embodiment. Members having the same functions as those of each embodiment described above are designated by the same reference numerals, and detailed descriptions thereof will be omitted.

In the sixth embodiment, as illustrated in FIG. 7, the gas turbine 10 includes the first heat exchanger 31, the second heat exchanger 32, the third heat exchanger 33, and the heat exchange amount adjusting device.

The first heat exchanger 31 is provided in the air intake line L1. A cooling air supply line L17 is provided between the compressor 11 and the cooling subject member 80. The cooling air supply line L17 is used to supply part of the compressed air CA compressed by the compressor 11 to the cooling subject member 80 as cooling air.

The second heat exchanger 32 is provided in the cooling air supply line L17. A first medium circulation line L13 is provided between the first heat exchanger 31 and the second heat exchanger 32. A circulation pump 41 and a flow rate adjusting valve 45 are provided in the first medium circulation line L13. Therefore, the circulation pump 41 can be driven to circulate the first medium HW between the first heat exchanger 31 and the second heat exchanger 32 through the first medium circulation line L13.

The third heat exchanger 33 is provided in the first medium circulation line L13. The circulation pump 41 and the flow rate adjusting valve 45 are provided on one side of the first medium circulation line L13 where the first medium HW flows from the first heat exchanger 31 to the second heat exchanger 32, and the third heat exchanger 33 is provided on the other side of the first medium circulation line L13 where the first medium HW flows from the second heat exchanger 32 to the first heat exchanger 31. The third heat exchanger 33 is provided in the second medium supply line L14, and the supply pump 42 is provided in the second medium supply line L14. The second medium supply line L14 causes the second medium (for example, air) A1 to flow through the second medium supply line L14. The circulation pump 41 and the flow rate adjusting valve 45 may be provided the other side of the first medium circulation line L13 where the first medium HW flows from the second heat exchanger 32 to the first heat exchanger 31, and the third heat exchanger 33 may be provided on one side of the first medium circulation line L13 where the first medium HW flows from the first heat exchanger 31 to the second heat exchanger 32.

The control device 14 controls the supply pump 42 as the heat exchange amount adjusting device based on the temperature of the air A to be taken into the compressor 11. The control device 14 adjusts a rotation speed of the supply pump 42 so that the temperature of the air A measured by the first temperature sensor 43 reaches a target temperature. In addition, a third temperature sensor 46 that measures a temperature of the compressed air CA between the second heat exchanger 32 and the cooling subject member 80 is provided in the cooling air supply line L17. The control device 14 controls the flow rate adjusting valve 45 based on the temperature of the compressed air CA cooled by the second heat exchanger 32. The control device 14 adjusts the opening degree of the flow rate adjusting valve 45 so that the temperature of the compressed air CA measured by the third temperature sensor 46 reaches a target temperature.

As described above, in the gas turbine of the sixth embodiment, while heat exchange is carried out between part of the compressed air CA bled from the compressor 11 and the first medium HW by the second heat exchanger 32 to supply the cooled compressed air CA to the cooling subject member 80, heat exchange is carried out between the heated first medium HW and the air A by the first heat exchanger 31, and the control device 14 controls the supply pump 42 so that the temperature of the air A reaches a target temperature.

Therefore, an output of the as turbine 10 can be adjusted to a target output with high accuracy regardless of a load of the gas turbine 10, and an operation region can be expanded by the single gas turbine 10.

In the gas turbine of the present embodiment, the third heat exchanger 33 as the compressed air cooling heat exchanger is provided in the first medium circulation line L13 that circulates the first medium HW between the first heat exchanger 31 and the second heat exchanger 32. Therefore, the first heat exchanger 31, the second heat exchanger 32, and the third heat exchanger 33 can be disposed in the first medium circulation line L13, which enables the device to be compact.

Seventh Embodiment

Figure 8:
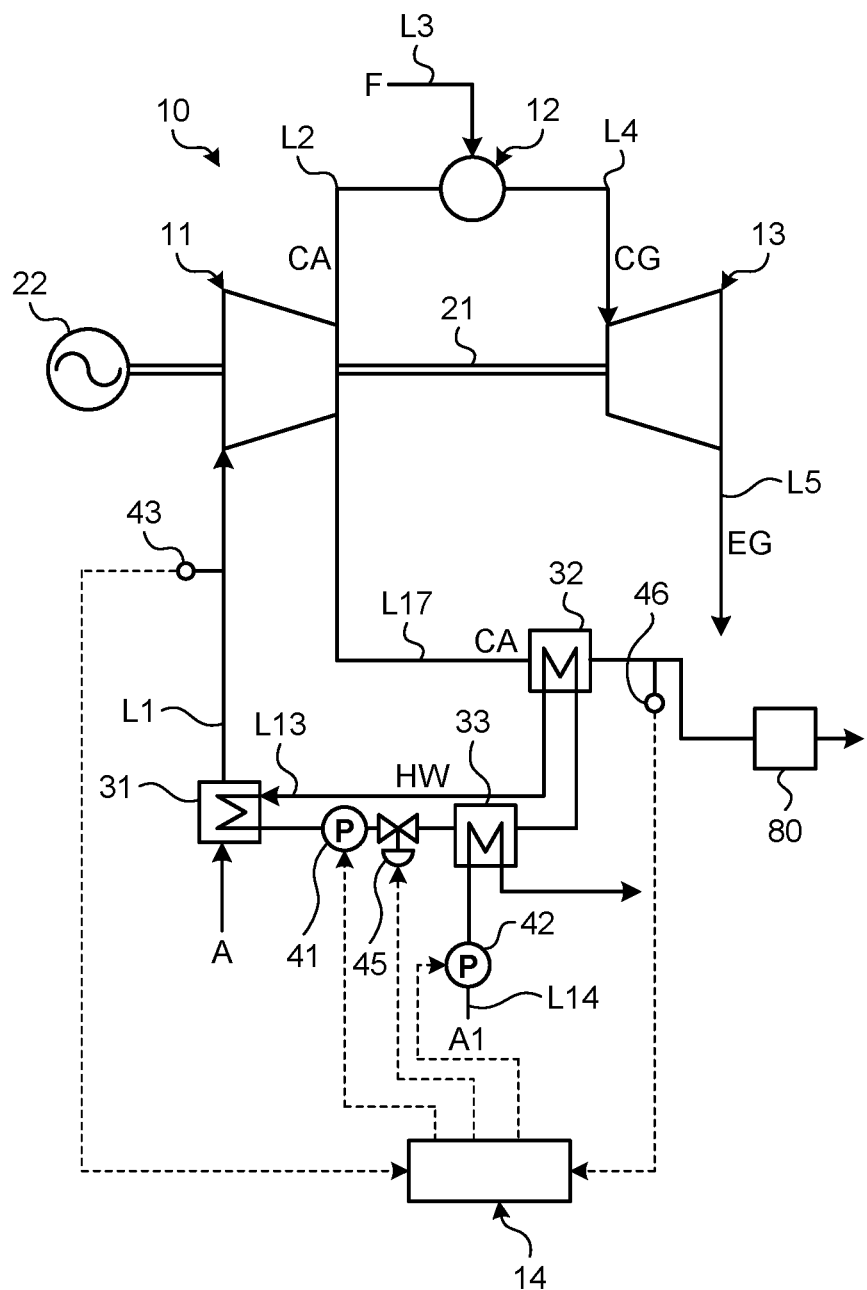
FIG. 8 is a schematic configuration diagram illustrating a gas turbine of a seventh embodiment.

FIG. 8 is a schematic configuration diagram illustrating a gas turbine of a seventh embodiment. Members having the same functions as those of the sixth embodiment described above are designated by the same reference numerals, and detailed descriptions thereof will be omitted.

In the seventh embodiment, as illustrated in FIG. 8, the gas turbine 10 includes the first heat exchanger 31, the second heat exchanger 32, the third heat exchanger 33, and the heat exchange amount adjusting device.

The first heat exchanger 31 is provided in the air intake line L1. The cooling air supply line L17 is provided between the compressor 11 and the cooling subject member 80. The second heat exchanger 32 is provided in the cooling air supply line L17. A first medium circulation line L13 is provided between the first heat exchanger 31 and the second heat exchanger 32. The circulation pump 41, the flow rate adjusting valve 45, and the third heat exchanger 33 are provided in the first medium circulation line L13. The circulation pump 41, the flow rate adjusting valve 45, and the third heat exchanger 33 are provided on one side of the first medium circulation line L13 where the first medium HW flows from the first heat exchanger 31 to the second heat exchanger 32. The circulation pump 41, the flow rate adjusting valve 45, and the third heat exchanger 33 may be provided on the other side of the first medium circulation line L13 where the first medium HW flows from the second heat exchanger 32 to the first heat exchanger 31.

The control device 14 controls the first flow rate adjusting valve 45 as the heat exchange amount adjusting device based on the temperature of the air A to be taken into the compressor 11. The control device 14 adjusts the opening degree of the flow rate adjusting valve 45 so that the temperature of the air A measured by the first temperature sensor 43 reaches a target temperature. In addition, the control device 14 controls the supply pump 42 based on the temperature of the compressed air CA cooled by the second heat exchanger 32. The control device 14 adjusts a rotation speed of the supply pump 42 so that the temperature of the compressed air CA measured by the third temperature sensor 46 reaches a target temperature.

As described above, in the gas turbine of the seventh embodiment, while heat exchange is carried out between part of the compressed air CA bled from the compressor 11 and the first medium HW by the second heat exchanger 32 to supply the cooled compressed air CA to the cooling subject member 80, heat exchange is carried out between the heated first medium HW and the air A by the first heat exchanger 31, and the control device 14 controls the flow rate adjusting valve 45 so that the temperature of the air A reaches a target temperature.

Therefore, an output of the as turbine 10 can be adjusted to a target output with high accuracy regardless of a load of the gas turbine 10, and an operation region can be expanded by the single gas turbine 10.

Eighth Embodiment

Figure 9:
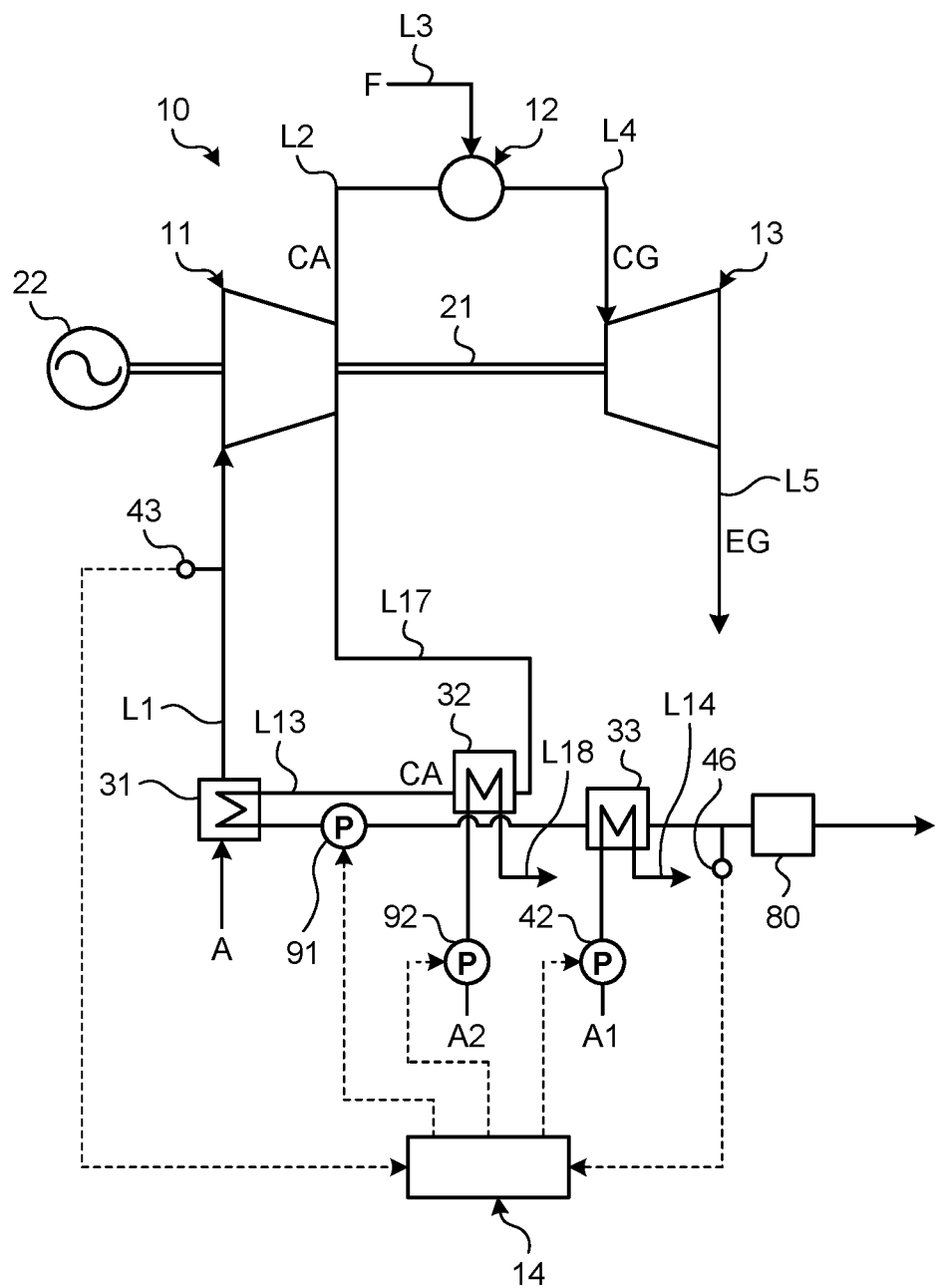
FIG. 9 is a schematic configuration diagram illustrating a gas turbine of an eighth embodiment.

FIG. 9 is a schematic configuration diagram illustrating a gas turbine of an eighth embodiment. Members having the same functions as those of the embodiments described above are designated by the same reference numerals, and detailed descriptions thereof will be omitted.

In the eighth embodiment, as illustrated in FIG. 9, the gas turbine 10 includes the first heat exchanger 31, the second heat exchanger 32, the third heat exchanger 33, and the heat exchange amount adjusting device.

The first heat exchanger 31 is provided in the air intake line L1. The cooling air supply line L17 is provided between the compressor 11 and the cooling subject member 80. The second heat exchanger 32, the first heat exchanger 31, and the third heat exchanger 33 are provided from an upstream side of the cooling air supply line L17 in a direction where the compressed air CA flows, in this order. In addition, in the cooling air supply line L17, a supply pump 91 is provided between the first heat exchanger 31 and the third heat exchanger 33.

The second heat exchanger 32 is provided in a third medium supply line L18, and a supply pump 92 is provided in the third medium supply line L18. The third medium supply line L18 causes a third medium (for example, air) A2 to flow through the third medium supply line L18. The third heat exchanger 33 is provided in the second medium supply line L14, and the supply pump 42 is provided in the second medium supply line L14.

The control device 14 controls the supply pump 92 as the heat exchange amount adjusting device based on the temperature of the air A to be taken into the compressor 11. The control device 14 adjusts a rotation speed of the supply pump 92 so that the temperature of the air A measured by the first temperature sensor 43 reaches a target temperature. In addition, the control device 14 controls the supply pump 42 based on the temperature of the compressed air CA cooled by the third heat exchanger 33. The control device 14 adjusts a rotation speed of the supply pump 42 so that the temperature of the compressed air CA measured by the third temperature sensor 46 reaches a target temperature.

As described above, in the gas turbine of the eighth embodiment, heat exchange is carried out between part of the compressed air CA bled from the compressor 11 and the third medium A2 by the second heat exchanger 32, heat exchange is carried out between the compressed air CA whose temperature is adjusted and the air A by the first heat exchanger 31, and the cooled compressed air CA is supplied to the cooling subject member 80. On the other hand, the control device 14 controls the supply pump 92 so that the temperature of the air A reaches a target temperature.

Therefore, an output of the gas turbine 10 can be adjusted to a target output with high accuracy regardless of a load of the gas turbine 10, and an operation region can be expanded by the single gas turbine 10.

The configurations of the air bypass line L16 and the flow rate adjusting valve 71 in the fifth embodiment may be used in the first to fourth embodiments and the sixth to eighth embodiments. In that case, the entire system may be used as a single gas turbine or a combined plant.

For example, in a case in which the configuration of the air bypass line L16 and the flow rate adjusting valve 71 is applied to the first, second, and fourth embodiments, the control performed by the flow rate adjusting valves 34 and 35 may be stopped. In a case in which the configuration of the air bypass line L16 and the flow rate adjusting valve 71 is applied to the third embodiment, the control performed by the flow rate adjusting valves 45 and 66 may be stopped. In addition, in a case in which the configuration of the air bypass line 116 and the flow rate adjusting valve 71 is applied to the sixth to eighth embodiments, the control performed by the flow rate adjusting valve 45, and the supply pumps 42 and 92 may be stopped.

In addition, in the above-described embodiments, the temperature of the air A to be taken into the compressor 11 is measured by the first temperature sensor 43 provided in the air intake line L11, but the present invention is not limited to this configuration. For example, the temperature of the air to be taken into the compressor may be set to an outside air temperature, or a temperature set according to seasons, weather, time, or the like may be used.

In addition, in the above-described embodiments, the turbine 13 and the cooling subject member 80 are applied as members subjected to temperature adjustment, and the air for heat exchange is used as the cooling air, so that the turbine 13 and the cooling subject member 80 are cooled with the cooling air, but the present invention is not limited to this configuration. For example, a configuration in which a heating subject member is applied as a member subjected to temperature adjustment, the air for heat exchange is used as heating air, and the heating subject member is heated with the heating air may be adopted.

In addition, the single gas turbine or the combined plant of the present invention is applied in the above-described first to eighth embodiments, but the present invention in which the single gas turbine is applied can be applied to the combined plant. Conversely, the present invention in which the combined plant is applied can also be applied to the single gas turbine. In addition, a plurality of the heat exchange amount adjusting devices applied in individual embodiments can be applied in combination.

REFERENCE SIGNS LIST

10 Gas turbine
11 Compressor
12 Combustor
13 Turbine
14 Control device
21 Rotating shaft
22 Generator
31 First heat exchanger (air temperature adjusting heat exchanger)
32 Second heat exchanger (air temperature adjusting heat exchanger)
33 Third heat exchanger (compressed air cooling heat exchanger)
34 First flow rate adjusting valve (heat exchange amount adjusting device)
35 Second flow rate adjusting valve (heat exchange amount adjusting device)
41 Circulation pump
42 Supply pump
43 First temperature sensor
44 Second temperature sensor
45 Flow rate adjusting valve (heat exchange amount adjusting device)
46 Third temperature sensor
50 Combined cycle plant
51 Heat recovery steam generator
52 Steam turbine
53 Generator
61 Stack
62 Turbine
63 Rotating shaft
64 Condenser
65 Condensate pump
66 Flow rate adjusting valve (heat exchange amount adjusting device)
71 Flow rate adjusting valve (heat exchange amount adjusting device)
80 Cooling subject member
91 Supply pump
92 Supply pump
L1 Air intake line
L2 Compressed air supply line
L3 Fuel gas supply line
L4 Combustion gas supply line
L5 Flue gas discharge line
L6 Flue gas discharge line
L7 Steam supply line
L8 Water supply line
L9 Cooling water line
L10 Water supply circulation line (second medium supply line)
L11 First cooling air supply line
L12 Second cooling air supply line
L13 First medium circulation line
L14 Second medium supply line
L15 Cooling air supply line
L16 Bypass line
L17 Cooling air supply line
L18 Third medium supply line
A Air
A1 Second medium
A2 Third medium
CA, CA1, CA2 Compressed air
CC Combustion gas
EG Flue gas
F Fuel
HW First medium
ST Steam
WS Water supply

The invention claimed is:

1. A gas turbine comprising:
a compressor that compresses air taken from an air intake line;
a combustor that mixes and combusts the compressed air compressed by the compressor and fuel;
a turbine that obtains rotational power using combustion gas generated by the combustor;
a compressed air cooling heat exchanger that cools the compressed air to produce air for heat exchange;
an air temperature adjusting heat exchanger that exchanges heat between the compressed air and the air to be supplied to the compressor;
a heat exchange amount adjusting device that adjusts a heat exchange amount of each of the compressed air cooling heat exchanger and the air temperature adjusting heat exchanger; and
a control device that controls the heat exchange amount adjusting device, wherein
the control device controls the heat exchange amount adjusting device based on a temperature of the air to be taken into the compressor,
the air temperature adjusting heat exchanger includes a first heat exchanger which is provided in the air intake line,
a first temperature sensor that measures a temperature of the air heat-exchanged by the air temperature adjusting heat exchanger is provided, and
the control device controls the heat exchange amount in the air temperature adjusting heat exchanger by the heat exchange amount adjusting device so that the temperature of the air measured by the first temperature sensor approaches a target temperature.

2. The gas turbine according to claim 1, wherein
a second temperature sensor that measures a temperature of the compressed air cooled by the compressed air cooling heat exchanger is provided, and
the control device controls the heat exchange amount in the compressed air cooling heat exchanger by the heat exchange amount adjusting device so that the temperature of the compressed air measured by the second temperature sensor is maintained at a target temperature.

3. The gas turbine according to claim 1, wherein
the first heat exchanger of the air temperature adjusting heat exchanger exchanges heat between the air and the compressed air, and the air temperature adjusting heat exchanger includes a second heat exchanger that exchanges heat between the compressed air and a medium, and
the heat exchange amount adjusting device adjusts a heat exchange amount in the second heat exchanger.

4. The gas turbine according to claim 1, wherein the heat exchange amount adjusting device includes an air bypass line that bypasses the air temperature adjusting heat exchanger to supply the air to the compressor, and a flow rate adjusting valve provided in the air bypass line.

5. A combined cycle plant comprising:
the gas turbine according to claim 1;
a heat recovery steam generator that generates steam by exhausted heat of flue gas discharged from the gas turbine; and
a steam turbine including a turbine driven by steam generated by the heat recovery steam generator.

6. A gas turbine comprising:
a compressor that compresses air;
a combustor that mixes and combusts the compressed air compressed by the compressor and fuel;
a turbine that obtains rotational power using combustion gas generated by the combustor;
a compressed air cooling heat exchanger that cools the compressed air to produce air for heat exchange;
an air temperature adjusting heat exchanger that exchanges heat between the compressed air and the air to be supplied to the compressor;
a heat exchange amount adjusting device that adjusts a heat exchange amount of each of the compressed air cooling heat exchanger and the air temperature adjusting heat exchanger; and
a control device that controls the heat exchange amount adjusting device, wherein
the control device controls the heat exchange amount adjusting device based on a temperature of the air to be taken into the compressor,
a first temperature sensor that measures a temperature of the compressed air cooled by the compressed air cooling heat exchanger is provided, and
the control device controls the heat exchange amount in the compressed air cooling heat exchanger by the heat exchange amount adjusting device so that the temperature of the compressed air measured by the first temperature sensor is maintained at a target temperature.

7. The gas turbine according to claim 6, wherein
a second temperature sensor that measures a temperature of the air heat-exchanged by the air temperature adjusting heat exchanger is provided, and
the control device controls the heat exchange amount in the air temperature adjusting heat exchanger by the heat exchange amount adjusting device so that the temperature of the air measured by the second temperature sensor approaches a target temperature.

8. The gas turbine according to claim 6, wherein
the air temperature adjusting heat exchanger includes a first heat exchanger that exchanges heat between the air and a first medium, and a second heat exchanger that exchanges heat between the compressed air and the first medium, and
the heat exchange amount adjusting device adjusts a heat exchange amount in the second heat exchanger.

9. The gas turbine according to claim 6, wherein
the air temperature adjusting heat exchanger includes a first heat exchanger that exchanges heat between the air and the compressed air, and a second heat exchanger that exchanges heat between the compressed air and a medium, and
the heat exchange amount adjusting device adjusts a heat exchange amount in the second heat exchanger.

10. The gas turbine according to claim 6, wherein the heat exchange amount adjusting device includes an air bypass line that bypasses the air temperature adjusting heat exchanger to supply the air to the compressor, and a flow rate adjusting valve provided in the air bypass line.

11. A combined cycle plant comprising:
the gas turbine according to claim 6;
a heat recovery steam generator that generates steam by exhausted heat of flue gas discharged from the gas turbine; and
a steam turbine including a turbine driven by steam generated by the heat recovery steam generator.

12. A gas turbine comprising:
a compressor that compresses air taken from an air intake line;
a combustor that mixes and combusts the compressed air compressed by the compressor and fuel;
a turbine that obtains rotational power using combustion gas generated by the combustor;
a compressed air cooling heat exchanger that cools the compressed air to produce air for heat exchange;
an air temperature adjusting heat exchanger that exchanges heat between the compressed air and the air to be supplied to the compressor;
a heat exchange amount adjusting device that adjusts a heat exchange amount of each of the compressed air cooling heat exchanger and the air temperature adjusting heat exchanger; and
a control device that controls the heat exchange amount adjusting device, wherein
the control device controls the heat exchange amount adjusting device based on a temperature of the air to be taken into the compressor,
the air temperature adjusting heat exchanger includes a first heat exchanger which is provided in the air intake line,
the first heat exchanger of the air temperature adjusting heat exchanger exchanges heat between the air and a first medium, and the air temperature adjusting heat exchanger includes a second heat exchanger that exchanges heat between the compressed air and the first medium, and
the heat exchange amount adjusting device adjusts a heat exchange amount in the second heat exchanger.

13. The gas turbine according to claim 12, wherein
a temperature sensor that measures a temperature of the air heat-exchanged by the air temperature adjusting heat exchanger is provided, and
the control device controls the heat exchange amount in the air temperature adjusting heat exchanger by the heat exchange amount adjusting device so that the temperature of the air measured by the temperature sensor approaches a target temperature.

14. The gas turbine according to claim 12, wherein
a temperature sensor that measures a temperature of the compressed air cooled by the compressed air cooling heat exchanger is provided, and the control device controls the heat exchange amount in the compressed air cooling heat exchanger by the heat exchange amount adjusting device so that the temperature of the compressed air measured by the temperature sensor is maintained at a target temperature.

15. The gas turbine according to claim 12, wherein
the first heat exchanger of the air temperature adjusting heat exchanger exchanges heat between the air and the compressed air, and the air temperature adjusting heat exchanger includes a second heat exchanger that exchanges heat between the compressed air and a medium, and
the heat exchange amount adjusting device adjusts a heat exchange amount in the second heat exchanger.

16. The gas turbine according to claim 12, wherein the heat exchange amount adjusting device includes an air bypass line that bypasses the air temperature adjusting heat exchanger to supply the air to the compressor, and a flow rate adjusting valve provided in the air bypass line.

17. A combined cycle plant comprising:
the gas turbine according to claim 12;
a heat recovery steam generator that generates steam by exhausted heat of flue gas discharged from the gas turbine; and
a steam turbine including a turbine driven by steam generated by the heat recovery steam generator.

* * * * *